United States Patent Office 3,745,008
Patented July 10, 1973

3,745,008
PHOTOGRAPHIC PROCESS
Ehrhard Hellmig, Leverkusen, Germany, assignor to Agfa-Gevaert Aktiengesellschaft, Leverkusen, Germany
Filed Apr. 13, 1971, Ser. No. 133,528
Claims priority, application Germany, Apr. 18, 1970,
P 20 18 734.2
Int. Cl. G03c 5/08; G03f 5/18
U.S. Cl. 96—45
4 Claims

ABSTRACT OF THE DISCLOSURE

Negative continuous tone images are produced from black-and-white or colored originals which originals are differing in their density range whereby the exposure time is determined only from the density of the light areas in the originals and wherein the photographic copying material for making the negative continuous-tone image has a certain characteristic curve which is defined below.

Figure 1:
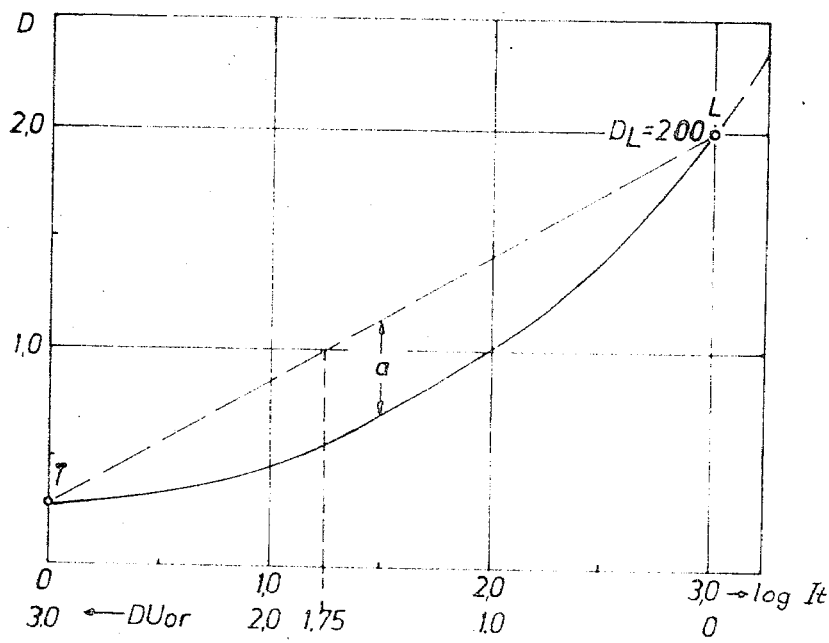

This invention relates to a process for the production of negative continuous-tone images and positive continuous-tone or screened images thereof.

According to common practice a continuous-tone original is reproduced by initially preparing a negative continuous-stone image thereof and producing from this negative continuous-tone image a positive continuous-tone or screened image, which is used as the copying original for the subsequent production of a printing form by a photomechanical process (e.g. copy on copying lacquer, photoresist, pigment paper or transfer film, etc.). The continuous-tone original can be a black-and-white or multi-colored image on an opaque or transparent support. In the case of a multi-colored image, the negative continuous-tone images are negative color separation records when they have been obtained by means of color separation filters. In general, these continuous-tone negatives are produced by an exposure in the reproduction camera, i.e. through optical image reproduction. They can, however, also be produced by a contact process.

In a fairly recent process which rationalizes processing of the exposed films, exposure of the continuous-tone recording material for producing the continuous-tone negatives is determined solely, irrespective of the density range of the originals, by the density of the "lights" of the originals, i.e. the lightest areas of greatest importance to the image (exposure "to light"). In this way, it is possible to obtain negatives with substantially the same light density $D_L$ for all originals, but with different density of the dark areas $D_T$, i.e. having a varying density range $DU_n$ (where $DU_N = D_L - D_T$).

Since the continuous-tone or screened positives to be taken therefrom must have standardized densities for light and shadow (DIN 16–602), standardization has to be carried out at this stage. It is known that a material whose gradation is arbitrarily variable within a predetermined range by the color of the light is used for the rationalized processing of exposed photographic materials in processing machines which does not allow any change in gradation. A material of this kind with "copy-variable gradation" is, for example, marketed by Messrs. Gevaert-Agfa NV under the name "GEVAREX film." GEVAREX is a trademark of Messrs. Gevaert-Agfa NV for a photographic color film. On exposure with blue light (light color $F_1$) it provides a flatter gradation and, on exposure with yellow light (light color $F_2$), a steeper gradation ($\gamma = 0.80$ and 1.40, respectively). On exposure to mixed light, it provides an intermediate gradation, with the result that continuous-tone positives with a standardized density range of 1.40 can be drawn from any negative having a density in the range from 1.00 to 1.70. An automatic apparatus (manufactured by Messrs. Gevaert Agfa NV) can be used to select the correct color of the copying light (yellow/blue exposure) and for exposure itself.

Since, as already mentioned, the gradation of a photographic material with copy-variable gradation can only be varied to a limited extent and, even in principle, cannot be increased to any appreciable extent, at least three photographic materials with invariable but different gradation ($\gamma$ approximately 0.50, 0.75, and 1.00) are required when the originals have a density range from 1.00 to 3.00, which is the case in practice.

When several types of photographic materials are needed for the same purpose, a number of disadvantages arise, both for the manufacturer and for the consumer, because they cannot be manufactured with the required degree of uniformity in all important photographic properties and, for example, show inevitable differences in sensitivity, in filter factors, in the tone of the image silver, in the fog level, in the so-called residual coloring (resulting from the sensitizer or from the antihalation layer), and in dimensional stability etc. The storage in dark rooms of several films by the manufacturer, by the supplier and, more particularly, by the consumer, is also a burden and requires particular attentiveness to avoid confusion. Moreover, the production of three different photographic materials is uneconomical, even for the manufacturer. In addition to this, it is extremely difficult, for reasons of emulsion technology, to produce light sensitive silver halide gelatin layers having a very flat straight characteristic curve reaching into high densities, as is required for at least the flattest of the three aforementioned materials.

The object of the present invention is to provide processes for the production of negative continuous-tone images which are suitable for automatic processing techniques carried out in machines by suitable selection of the sensitometric properties of the copying materials used.

A process for the production of negative continuous-tone images or color separation records, in a camera or by contact, has now been found which starts from black-and-white or colored originals of differing density range either on opaque or on transparent supports including the steps of exposing a photographic material having at least one supported silver halide emulsion layer to the original and subjecting the exposed material to a development which is the same for all negative continuous-tone image or color separation records whereby the exposure time is determined solely by the density of the light areas in the originals, irrespective of their density range, and whereby the said photographic material comprises at least one light sensitive silver halide emulsion layer, the silver halide emulsion of which having a charcateristic curve with a substantially uniform sag at least in the log It range of the maximum density range of the originals.

The features characterizing the invention are shown in FIG. 1. The characteristic curve begins with a relatively shallow rise which, at higher log It values, continues progressively and which in FIG. 1 reaches the required density value $D_L$ in the negative image (in this case $D_L = 2.00$) for the light at the point log It=3.0, where the "light" of the original is. In addition, the characteristic curve continues a little further in the same way but at least linearly. The blackening curve represents the tone-value reproduction for an original with the high range DUor of 3.00 (reversal transparent color originals). The range $DU_N$ of the negative is 1.70 (dark 0.30; light 2.00).

The minimum permitted range of the negative for the aforementioned Gevarex process must be 1.00, corresponding to a range of the original also of 1.00 on exposure "to light." Thus, any original with a density range from 1.00 to 3.00 can be reproduced with this one film given the aforementioned exposure method (exposure "to light"). Thus, compared with the use of a photographic material with a straight characteristic curve (shown by the dashed curve of FIG. 1), which only permits the reproduction of originals with a density range from 1.75, the reproduction range has been increased by 1.75 to 1.00 or by 60%.

Surprisingly, the tone-value reproduction does not suffer any adverse effects by using a photographic material with a sagging characteristic curve. On the contrary, it is actually improved. This not only applies to the reproduction of originals with a very high contrast range, but also to any original which can be reproduced with this material down to the density range 1.00.

Figure 2:
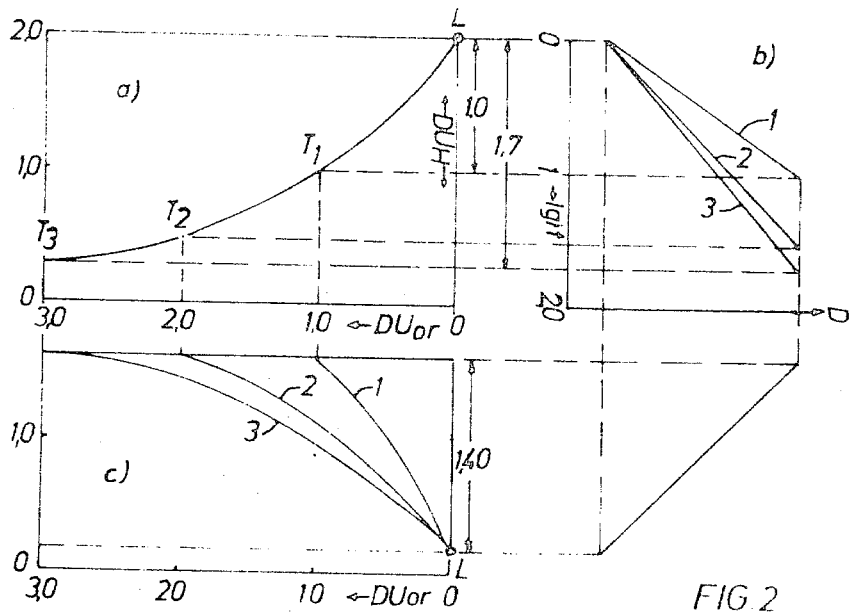

This can best be seen from the characteristic curve of the positive produced from these negatives on to copy variable material (Gevarex film). The characteristic curve (as in FIG. 1) of the photographic material for the production of the negative in the process according to the invention is shown in FIG. 2a. The density ranges of a negative produced from an original with the range of 1.0; 2.0 and 3.0 amount to 1.0; 1.50 and 1.70, respectively. The corresponding gradations for the copying material (Gevarex film) are shown in FIG. 2b, which is turned through 90° in accordance with the known graphical convention for copying curves ("windmill diagram"). The characteristic curve of the standardized continuous-tone positives is obtained therefrom, as shown in FIG. 2c. It can be seen from FIG. 2c that the characteristic curve 3, which belongs to the original with the highest density range 3.00, follows a curved path. The tone value reproduction of the dark areas of the image is flattened at the expense of the light areas of the image. This, however, is the very tone value curve which is required in practice (cf. for example Peter Kasper: "Standardisierungsmethoden bei der Herstellung von Halbtonfarbauszügen," in Polygraph-Jahrbuch 1969, Polygraph-Verlag, Frankfurt-on-Main, pages 85 et seq.).

The smaller the density range of the original, the greater the extent to which the flattening of the dark image areas is eliminated (curves 2 and 1, in FIG. 2c) so that the tone value reproduction curve belonging to the original having the lowest reproducible density range 1.00 (curve 1 in FIG. 2c) follows a substantially straight path. This trend of the characteristic curves also fully satisfies practical requirements, which always demand large scale similarity in density of the light areas of the image, because they ultimately determine the quality of image reproduction, whilst the dark areas of the image have to be reproduced with greater flattening the greater the total number of tone values that have to be accommodated within the predetermined density range of the positive (DU=1.40), that is, the higher the density range of the original.

The tone value course of the negative characteristic curve (FIG. 1) must have a substantially uniform sag throughout the log It range in question, which is determined by the density range of the originals to be reproduced. In this context, the sag is the vertical interval between the negative characteristic curve and a straight line between the end points T and L (dark and light) in FIG. 1. The sag is measured by the maximum interval $a$ between the aforementioned curve and straight line, based on the density range $DU_N$ of the negative (vertical interval between T and L). The expression "substantially uniform sag" means that the maximum deviation is not situated in the vicinity of the end points T and L but in the central region of the tone value scale DUor, which substantially comprises the second and third quarters of this scale. The extent of the sag in photographic materials to be used in practice is governed by the requirements of the particular reproduction process, and in particular by the extent of the permitted or required flattening of the dark tone values. Rarely will it exceed 50% of the negative range $DU_N$, preferably being in the range from 10 to 40% of $DU_N$. It is not necessary for the tone value curve (FIG. 1) to be curved over its whole length: it can, instead, be locally straight, particularly at low densities (dark) or even at high densities (light).

The present invention is not limited to the above example, but lends itself to many variations. For example, the characteristic curve (FIG. 1) does not always have to extend through a range of 3.00 log It units when the maximum density range of the originals to be reproduced is relatively low. Consequently, a negative curve sufficient for reproducing reflection originals which, for example, do not have a density range exceeding 2.00 will itself only extend over a log It range of 2.00. The same applies to exposures of fairly contrasting originals in the camera, because the diffusing screen frosted gloss image of the camera does not have a density range exceeding 2.00 either, because of the influence of diffuse light.

Neither is the process according to the invention confined to the requirement that the density range of the negatives produced by the process should be between 1.00 and 1.70. Other values for the density range of the negatives can be established, depending upon the conditions prevailing during further processing of the continuous-tone negatives, and more especially on the effectiveness of the copying film. The density $D_L$ for the light in the negative can also differ from 2.00.

Neither do the characteristic curves of the continuous-tone copying film (FIG. 2b) have to follow a straight path. For example, they can be steeper or flatter in the higher densities (dark) than in the lower densities, with the result that the tone value curve can be specifically influenced in the dark areas of the continuous-tone positive.

Depending upon the purpose for which it is to be used, the light sensitive photographic material for the process according to the invention can be given different levels of spectral sensitivity. As usual, it is only blue-sensitive or orthochromatic for the reproduction of black-and-white originals, but panchromatic for the production of color separation records. In the latter case, it preferably has the same sensitivity on exposure behind the repro-separation filters (filter factors blue:green:red=1:1:1) because the exposure operation is rationalized to a considerable extent in this way. In regard to its strucutre, the film can consist of one or more light sensitive silver halide emulsion layers, which can be arranged either on the same side or on both sides of the support, optionally with screening dyes for suppressing the diffusion of light into the layers.

With particular advantage the photographic material can comprise two light sensitive silver halide emulsion layers, one of which is relatively highly sensitive with flat gradation, whilst the other is steeper and of lower threshold sensitivity, because it is possible in this way, in contrast to mixing the two emulsions, to obtain maximum sensitivity, which is especially important for panchromatic films. When sensitivity is not a crucial factor (e.g. for black-and-white photographs or contact separation records), the two emulsions can be mixed and applied as a single layer to a support.

Finally, in order to obtain the characteristic curve of the photographic material for the process according to the invention, the silver halide emulsion can also comprise three or even more component emulsions with a variety of different properties. The person having ordinary skill in the art of emulsion making will be familiar with the production of emulsions of this kind.

It is also possible to produce standardized, screened positives from the continuous-tone negatives obtained by the process, as and when it is required by the printing technique (e.g. for offset or letterpress), by using as the copying material a so-called lithofilm in conjunction with a colored, especially a magenta-colored contact screen.

In this instance, the contrast is regulated in fundamentally the same way as in the production of continuous-tone copies by exposure with suitably colored copying light.

Reference is made to U.S. Patent 3,676,122 or Belgian patent specification 735,777 for the production of the negatives, the features of the photographic material for that production and the further processing of the negatives.

Photographic materials suitable for the process according to the invention are produced by methods known per se. When the characteristic requirements, which must be satisfied by the characteristic curves, have been established, it is readily possible, by measures conventional in emulsion technology, to produce photographic materials which satisfy these requirements.

EXAMPLE

A layer of the emulsion Atopan (BIOS Final Report No. 1355, page 42) is cast in a thickness of 7μ on a transparent, colorless layer support of polycarbonate based on bis-phenylolpropane having a thickness of 140μ which has a dark green antihalation layer which is discolored in the photographic processing baths on the other side. The red sensitizer Rr 1953 (FIAT Final Report 943, pages 53 to 56) is added to the emulsion in addition to wetting agents, stabilizers and the mixture of equal parts of green sensitizers Rr 340 and Rr 1650.

This layer is then covered with the fine grain Isopan emulsion from BIOS Final Report No. 1355, page 35, also in a thickness of 7μ, but in this case the Isopan emulsion also contains an addition of the red sensitizer Rr 1953 in addition to the same two green sensitizers.

On this layer is then cast a 1–1.5μ thick protective layer of pure hardened gelatine.

The two-layered light sensitive film is used for the production of color separation records for multicolor reproduction. Development is carried out for 5 minutes on the following back-and-white developer:

| | G. |
|---|---|
| Monomethyl-p-aminophenolsulphate | 7.5 |
| Anhydrous sodium sulfite | 40.0 |
| Hydroquinone | 3.5 |
| Anhydrous soda | 30.0 |
| Potassium bromide | 3.0 |
| Make up with water to 1 l. | |

1 part of the developer is diluted with 1 part of water before use. Development time 5 minutes at 20° C. followed by fixing washing and drying.

What is claimed is:

1. A process for the production of negative continuous-tone images starting from black-and-white or colored originals differing in their density range including the steps of exposing a photographic material having at least one supported silver halide emulsion layer to the original and subjecting the exposed material to a development which is the same for all negative continuous-tone image or color separation records whereby the exposure time being determined solely by the density of the light areas in the originals irrespective of their density range, and wherein the said photographic material has a characteristic curve with a substantially uniform sag at least in the log It range of the maximum density range of the originals.

2. The process of claim 1 wherein the maximum deviation of the sagging of the characteristic curve of the photographic material from a straight line connecting the points having the highest and the lowest density important to the image (light and dark areas) is from 10 to 50% of the difference between the highest and lowest density (=density range of the negative).

3. A process of making continuous tone positive images from a negative produced by the process of claim 1 including the step of exposing to said negative a light sensitive photographic material having at least one silver halide emulsion layer variable in gradation with the color of the copying light (component exposure with two light colors $F_1$ and $F_2$) whose sensitivity is such that substantially the same density is always obtained in the continuous tone positive image, equivalent to the required density value for the light, on equal exposure with light of color $F_1$ on the one hand and of color $F_2$ on the other hand and/or on proportionate exposure with $F_1$ and $F_2$.

4. A process of making screened positive images from the continuous-tone negative produced by the process of claim 1 including the step of exposing to said negative a photographic material having at least one supported silver halide emulsion layer with a steep gradation of at least 7 through a colored contact screen arranged between the negative and the said photographic material whose optical density is variable by the color of the copying light (component exposure with the two copying lights $F_1$ and $F_2$), the sensitivity of the said photographic material to $F_1$ and $F_2$ being such that substantially the same density value (the same dot size in the screened image), equivalent to the required value for the light, is always obtained on equal exposure to light of color $F_1$ on the one hand and to light of color $F_2$ on the other hand and/or on proportionate exposure with $F_1$ and $F_2$.

References Cited

UNITED STATES PATENTS

| 2,971,841 | 2/1961 | Moore | 96—30 |
| 3,304,178 | 2/1967 | Atkinson | 96—23 |

NORMAN G. TORCHIN, Primary Examiner

A. T. SURO PICO, Assistant Examiner

U.S. Cl. X.R.

96—17, 23

UNITED STATES PATENT OFFICE
CERTIFICATE OF CORRECTION

Patent No. 3,745,008            Dated July 10, 1973

Inventor(s)    E. Hellmig

It is certified that error appears in the above-identified patent and that said Letters Patent are hereby corrected as shown below:

Column 1, lines 25-26, "continuous-stone" should read
-- continuous-tone -- line 51, "$DU_n$" should read -- $DU_N$ -- line 54, "DIN 16-602" should read -- DIN 16 602 -- line 60, "gradiation" should read -- gradation --

Column 4, line 45, "strucutre" should read -- structure --

Signed and sealed this 25th day of December 1973.

(SEAL)
Attest:

EDWARD M. FLETCHER, JR.
Attesting Officer

RENE D. TEGTMEYER
Acting Commissioner of Patents